Dec. 28, 1965  S. H. MAGID  3,225,764
BABY PANTS OR OTHER ARTICLE HAVING TUBULAR EDGING
Filed Dec. 19, 1962
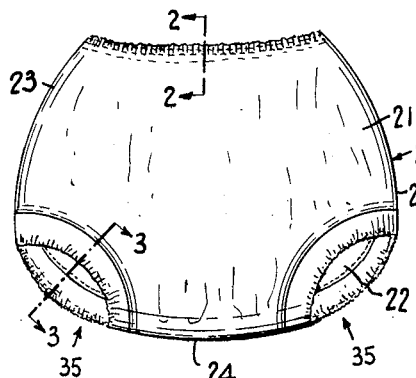
FIG.1
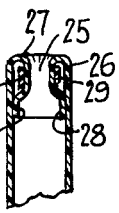
FIG.2
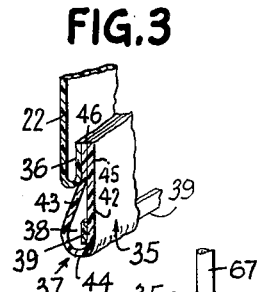
FIG.3
FIG.4
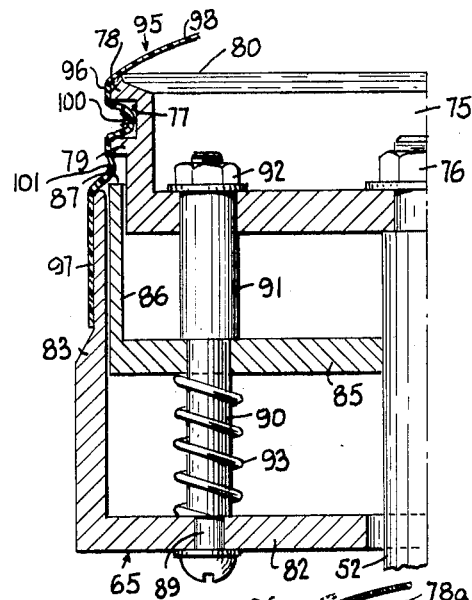
FIG.5
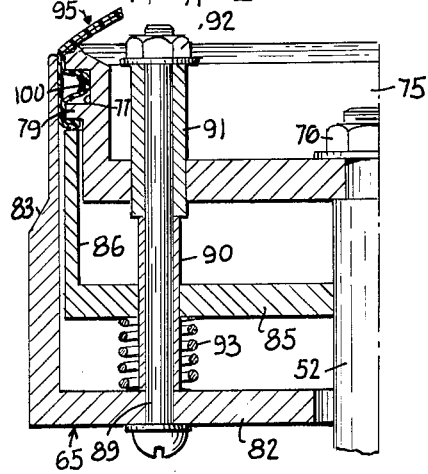
FIG.6
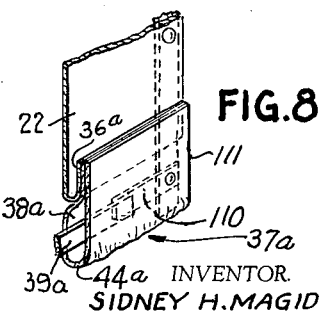
FIG.7
FIG.8
INVENTOR.
SIDNEY H. MAGID
BY
*Perce Freeman*
ATTORNEY.

the teachings
of the present invention.

FIG. 2 is a partial sectional view taken substantially along the line 2—2 of FIG. 1.

FIG. 3 is a partial sectional view taken substantially along the line 3—3 of FIG. 1.

FIG. 4 is a schematic elevational view, partly in section, showing apparatus for use in attaching the edging to a baby pants leg opening according to an embodiment of the present invention.

FIG. 5 is a partial sectional elevational view, greatly enlarged, showing an element of the apparatus of FIG. 4, and illustrating an initial stage in the instant method of manufacture.

FIG. 6 is a view similar to FIG. 5, but showing a slightly later stage in the method of manufacture.

FIG. 7 is a sectional elevational view similar to FIG. 5, but showing a slightly modified apparatus for use in practice of the present invention.

FIG. 8 is a partial sectional view somewhat similar to FIG. 3, but taken across a leg opening and adjacent body portion of a pair of snap pants.

Referring now more particularly to the drawings, and specifically to FIGS. 1–3 thereof, a pair of baby pants is there generally designated 20, which may be fabricated of flexible, thermoplastic sheet material and include front and back walls 21 and 22 secured together along the side edges 23 and across the crotch 24 to define a pants body. The front and back walls 21 and 22 may be formed separately or integrally formed of a single sheet, as desired.

The upper end or top of the baby pants 20 is open between the front and back walls 21 and 22 to define a waist opening 25, see FIG. 2. The waist opening 25 may be bounded by a hem 26 formed of a inturned peripheral margin 27 having its edge portion 28 secured to the body of the pants as defined by the front and back walls 21 and 22. The edge portion 28 may be secured by heat-sealing, cement, or other suitable means; and, interiorly of the hem 26 is advantageously provided an endless elastic constricting element 29 serving yieldably to constrict the waist opening.

The lower region of the body of the baby pants 20 is provided with a pair of laterally spaced leg openings 35. Each leg opening 35 is bounded by a marginal edge 36 of the front and back walls 21 and 22, to which is secured an endless or annular tubular edging 37. The tubular edgings 37 are each advantageously fabricated of flexible thermoplastic sheet material, such as impervious polyethylene, vinyl, or other suitable synthetic plastic, and each defines an endless internal passageway or tunnel 38 within which is located a constricting element 39, say an endless elastic member. It is also important to note that the walls of the tunnel, chamber or interior passageway 38 of the edging 37 are spaced apart so as to contain entrapped therein a quantity of gas, such as air.

More particularly, each annular edging 37 may be fabricated of a single annular or endless band of flexible thermoplastic material which is folded circumferentially upon itself to provide of the band a pair of facing, inner and outer flaps 42 and 43 connected together by the bight 44 of the fold. The facing flaps 42 and 43 are spaced apart by the entrapped gas in chamber 38, and the edge regions 45 and 46 of the respective inner and outer flaps are secured together in face-to-face engagement, with the outer edge region 46 being secured in face-to-face engagement with the inturned marginal edge 36 of the pants body 21, 22.

The edges of the flaps 45 and 46, as well as the pants body edge 36 may advantageously be contiguous and coinciding throughout their circumferential extent, all being cemented, heat-sealed, or otherwise hermetically sealed.

By this construction, the edgings 37 are pneumatic, containing entrapped air, and have proved to be much longer-wearing and without possibility of discomfort to the wearer. That is, by reason of the entrapped air, the gathers formed in the edgings 37 under the constricting action of elastic 39 do not form repeatedly in the same pattern or location, but assume random patterns and locations upon each constriction so that maximum wear and comfort are achieved.

The apparatus of the present invention is shown in FIGS. 4–7, and is generally similar to that described in my prior Patent No. 2,985,221. Referring to FIG. 4, the apparatus includes a column 52 which extends upwardly from a base (not shown) and supports a fabricating assembly designated generally at 65 as by fastener 76. Above the assembly 65 is a platen 66 which may be vertically movable downward toward and upward away from the fabricating assembly 65. Thus, by a rod 67 and suitable actuating means (not shown) the upper platen 66 may be moved into and out of operative relation with the fabricating assemblies 65.

Suitable electrical connections, as at 71 to the assembly 65, and at 72 to the platen 66, are provided to electrically effect the desired uniting by welding or heat-sealing of the thermoplastic material. A pants body 20a is shown in position on the apparatus of FIG. 4 with the leg openings 35a disposed over respective assembly 65.

In FIG. 5 is shown in detail the construction of a fabricating assembly 65, wherein an upper, upwardly facing cupped sealing element 75 is fixed on the upper end of column 52, as by a fastener nut 76. The upper cupped element 75 is provided with an external, circumferentially extending annular recess or groove 77 defined between a pair of vertically spaced, upper and lower annular, external ribs or shoulders 78 and 79. The upper edge 80 of the upper cupped sealing element 75 may be sharp, as illustrated for cutting excess material, but this is not essential to the instant method.

A lower cupped folding element 82 is arranged beneath the upper cupped element 75, and movable vertically relative to the latter along the column 52. It will be noted that the lower cupped folding element 82 is also oriented upward and has an upstanding peripheral wall 83 of an internal diameter slightly greater than the external diameter of the ribs 78 and 79 of the upper cupped sealing element 75. Thus, the lower cupped element 82 is movable upward to receive in the upper region thereof the upper cupped element 75.

Intermediate the upper and lower cupped elements 75 and 82 is located an upwardly facing intermediate cupped clamping element 85 which has an upstanding peripheral wall 86 of an external diameter approximately equal to that of the ribs 78 and 79, and an internal diameter slightly greater than the external diameter of the upper cupped element below the lower rib 79. Thus, the intermediate cupped clamping element 85 is movable vertically within the lower cupped element 82, and movable vertically to receive the lower region of the upper cupped element 75; and, the upper edge 87 of the intermediate cupped element wall 86 is movable toward and away from the underside of annular rib or shoulder 79.

Mounting the lower and intermediate cupped elements 82 and 85 for the above-described relative motion is a headed rod or shaft 89 extending upward through the lower, intermediate and upper cupped elements, and provided with a lower tubular spacer 90 extending slidably through the intermediate cupped element 85, and an upper tubular spacer 91 extending slidably through the upper cupped element 75. An enlarged fastener element or nut 92 is secured on the upper end of the shaft 89 retaining the tubular spacers 90 and 91 in position. Thus, as best seen in FIG. 6, the vertical rod or shaft 89 is secured fast to the lower cupped element 82 and upstands therefrom, with the intermediate cupped element 85 slidable on the lower spacer 90 and urged into abutment with the lower end of upper spacer 91, as by means of a resilient compression spring 93. The intermediate and lower cupped elements 85 and 82 are thereby yieldably maintained in vertically spaced relation, and are together freely slidable vertically relative to the upper cupped element 75.

Upon upward vertical movement of the lower folding element 82, the intermediate clamping element 85 moves upward with the folding element until upward movement of the intermediate clamping element is stopped by the lower rib or shoulder 79 of the upper cupped sealing element. The folding element 82 may continue its upward movement relative to both the clamping element 85 and sealing element 75, the condition shown in FIG. 6.

As illustrated in FIG. 5, an annular or endless band or tube 95 of flexible thermoplastic sheet material is circumposed about the sealing element 75, as at 96, and about the upper region of the folding element 82, at 97. The upper edge margin 98 of the band 95 may extend inward over the upper edge 80 of the sealing element 75.

A resilient constricting element 100 is engaged about the upper band portion 96 in the region of the annular recess or groove 77 to further constrict or radially contract the band into the groove. More specifically, the groove 77 is of such depth relative to the dimensions of the constricting element 100, that the band is contracted into the groove to a depth substantially greater than the thickness of the constricting element.

The endless band or tube 95 tends to hug closely to the contour of the support assembly and thus, when the folding and the clamping elements 82 and 85 are then moved upward, the upper edge 87 of the clamping element 85 pinches or clamps an intermediate band portion 101 against the underside of rib or shoulder 79. Upon continued upward movement of the folding element 82, the band portion 97 is folded upward to overlie the band portion 96 and assume the condition shown in FIG. 6. It will there be observed that the constricted band portion in the groove 77 is radially spaced inward away from the overlying band portion 97 to insure the presence of a quantity of air between the overlapping band portions. In this condition, the overlying upper edges of the band 95 may be united, as by heat-sealing or otherwise, and simultaneously applied to the leg opening of a pants body (as indicated diagrammatically in FIG. 4), in the same manner as described in my prior patents. It will now be understood that the method of the instant invention provides an endless gas-containing tube of flexible sheet material and otherwise fully accomplishes its intended objects.

A slightly modified embodiment of the instant invention is shown in FIG. 7, wherein an upper upwardly facing cupped sealing element 75a is fixedly mounted on the upper end of a column 52a, and a lower cupped clamping element 85a is arranged beneath and movable vertically relative to the sealing element. The clamping element 85a corresponds to the intermediate cupped clamping element 85 of the previously described embodiment, and includes an upstanding peripheral side wall 86a which has its upper edge 87a movable into and out of abutment with the underside of an annular rib or shoulder 79a provided exteriorly on the sealing element 75a. In addition to the annular rib or shoulder 79a, the sealing element 75a is provided with an upper annular, external rib or shoulder 78a spaced above the rib or shoulder 79a and combining therewith to define therebetween an external annular recess or groove 77a.

The clamping element 85a may be provided with an upstanding pin 89a extending slidably through the sealing element 75a and provided on its upper end with an enlargement 92a limiting downward withdrawal of the clamping element 85a.

A flexible sheet of thermoplastic material 95a is arranged circumferentially about the support assembly 65a having its upper portion 96a about the sealing element 75a and having its lower portion 97a about the clamping element 85a. A constricting element 100a is engaged about the upper band portion 96a in the region of groove 77a to constrict the band into the groove to a depth greater than the thickness of the constricting element. The clamping element 85a is moved upward and by reason of the tendency of the band 95a to hug the support assembly, an intermediate region 10a of the band 95a is pinched or clamped between the upwardly facing edge 87a and shoulder 79a, whereupon the lower band portion 97a may be swung upward manually or otherwise to the dotted-line position about the folded intermediate portion 101a. In this condition, the band may be united at its upper circumferential edges hermetically to seal a quantity of air in the tunnel thus defined.

In FIG. 8, there is shown the application of the edging 37a to a snap pants, as distinguished from the closed type baby pants shown in FIG. 1. This type of baby pants is clearly illustrated and described in my Patent No. 2,944,550.

The improvement referred to in this application applies equally well to the snap pants illustrated in FIG. 8 and referred to in my former patent, the improved feature being the annular edging which is attached to the body being formed of flexible thermoplastic air-impervious material folded circumferentially upon itself to provide two flaps and a bight as 44a therebetween, with an elastic constricting element 39a in said bight, and with the flaps being bonded to the body along the edge 36a and at the side edges of each leg to define a hermetically sealed enclosure or tunnel with air entrapped therein. The end portion of the elastic constricting element 39a is secured to thermoplastic material 110 which in turn is secured to the edging ends 111.

From the foregoing, it is seen that the present invention provides a unique and highly advantageous structure of flexible sheet material, and method of and apparatus for making the same, all of which are well adapted to meet practical conditions of use and fully achieve their intended objects.

Although the term of air is used, gas may be substituted in special circumstances for air.

Although the present invention has been described in some detail by way of illustration and example for purposes of clarity of understanding, it is understood that certain changes and modifications may be made within the spirit of the invention and scope of the appended claims.

What I claim is:

1. An article of thermoplastic material having attached thereto at least one annular edging formed of a band of flexible thermoplastic air-impervious material, said annular edging being folded circumferentially upon itself to provide two flaps and a bight therebetween, said flaps being bonded to said article and defining a hermetically sealed tunnel, there being a quantity of air and an elastic constricting element in said tunnel, said air being of sufficient quantity to maintain the confronting walls of the tunnel free to move relative to each other when said constricting element is in the contracted state.

2. An article of thermoplastic material having attached thereto at least one annular edging formed of a band of flexible thermoplastic air-impervious material, said annular edging being folded circumferentially upon itself to provide two flaps and a bight therebetween, said flaps being bonded to each other and to one face of said article and defining a hermetically sealed tunnel, there being a quantity of air and an elastic constricting element in said tunnel, said air being of sufficient quantity to maintain the confronting walls of the tunnel free to move relative to each other when said constricting element is in the contracted state.

3. As an article of manufacture, an edging formed of a band of flexible air-impervious thermoplastic material folded longitudinally upon itself to provide two flaps and a bight therebetween, said flaps being secured to each other and defining a hermetically sealed tunnel with air entrapped therein, said tunnel also having enclosed therein an elastic constricting element, said air being of sufficient quantity to maintain the confronting walls of the tunnel free to move relative to each other when said constricting element is in a contracted state.

4. An article of manufacture comprising a pair of baby pants of thermoplastic material, having a waist opening and two leg openings, an annular edging attached around the rim of each of said leg openings, said annular edging being formed of a band of flexible thermoplastic air-impervious material folded circumferentially upon itself to provide two flaps and a bight therebetween, said flaps being bonded to each other defining a hermetically sealed tunnel with a quantity of air therein and at least one of said flaps being secured to said blank, with air in said tunnel, said tunnel also having an elastic constricting element enclosed therewithin, said air being of sufficient quantity to maintain the confronting walls of the tunnel free to move relative to each other when said constricting element is in a contracted state.

5. An article of manufacture comprising a pair of baby pants of thermoplastic material having a waist opening and leg openings, an annular edging attached to said body around the rim of each of said leg openings, said annular edging being formed of a band of flexible thermoplastic air-impervious material folded circumferentially upon itself to provide two flaps and a bight therebetween, said flaps being bonded to one face of said body, and defining a hermetically sealed tunnel, there being a quantity of air and an elastic constricting element in said tunnel, said air being of sufficient quantity to maintain the confronting walls of the tunnel free to move relative to each other when the constricting element is in contracted state.

References Cited by the Examiner

UNITED STATES PATENTS

| | | | |
|---|---|---|---|
| 2,768,107 | 10/1956 | Magid | 128—288 X |
| 2,944,550 | 7/1960 | Magid | 128—287 |
| 2,985,221 | 5/1961 | Magid | 154—1.8 |
| 3,043,307 | 7/1962 | Weston | 128—295 |

RICHARD A. GAUDET, *Primary Examiner.*

JORDAN FRANKLIN, *Examiner.*